Aug. 13, 1968  G. W. SEIFERT  3,396,909
COOLING FAN FOR INTERNAL-COMBUSTION ENGINE HAVING
THERMOSTATICALLY OPERATED CLUTCH
Filed Dec. 7, 1966  2 Sheets-Sheet 1

Gerd W. Seifert
*Inventor.*

By Karl G. Ross
*Attorney*

Aug. 13, 1968   G. W. SEIFERT   3,396,909
COOLING FAN FOR INTERNAL-COMBUSTION ENGINE HAVING
THERMOSTATICALLY OPERATED CLUTCH
Filed Dec. 7, 1966   2 Sheets-Sheet 2

Gerd W. Seifert
INVENTOR.

BY

Karl G. Ross
Attorney

United States Patent Office 3,396,909
Patented Aug. 13, 1968

3,396,909
COOLING FAN FOR INTERNAL-COMBUSTION ENGINE HAVING THERMOSTATICALLY OPERATED CLUTCH
Gerd W. Seifert, 8919 Unterschondorf (Ammersee), Germany
Filed Dec. 7, 1966, Ser. No. 599,908
Claims priority, application Germany, Dec. 10, 1965, S 100,891
9 Claims. (Cl. 230—271)

ABSTRACT OF THE DISCLOSURE

A cooling-fan system for automotive vehicles and the like having internal-combustion engines and having a thermostatically operated clutch with a self-tightening screw-and-nut arrangement operated upon initial engagement of the clutch surfaces to drive the clutch members together, a thermostatic element being provided for initially urging the clutch into its engaged condition.

My present invention relates to cooling systems for automotive vehicles and, more particularly, to improvements in thermostatically controlled fans or blowers for these systems.

In my U.S. patents No. 3,209,993 and No. 3,273,681 there are described thermostatic, torque-responsive clutches having a bimetallic element in the path of the air stream passing through the vehicle radiator and shiftable between clutch-opening and clutch-closing positions. In those systems, a self-tightening screw-and-nut mechanism was provided to develop the axial force necessary to ensure full engagement of the clutch. In general, self-tightening clutches of this type can be considered to have two cooperating clutch members, originally disengaged which are brought into rapid interengagement with the aid of a pair of cooperating camming formations (e.g., mating threads of large pitch-angle) which will be referred to hereinafter as coarse-pitch or steep-pitch threads. The interengagement is promoted by an incipient rotary entrainment of one clutch member by the other as initiated by the thermostatic devices.

In prior-art thermostatic clutches, a difficulty has arisen because of the use of a spiral bimetallic element for promoting angular movement of the self-tightening device. It is found that these arrangements are not sufficiently rapidly operating and are characterized by high wear of the cooperating parts. Moreover, they are relatively more complex and difficult to repair.

It is, therefore, the principal object of the present invention, to provide a rapidly operating thermostatically controlled clutch having steep-pitch self-tightening means but avoiding the disadvantages of conventional systems.

This object and others which will become apparent hereinafter are attained, in accordance with the present invention, in a clutch system for a fan wherein a driving-clutch member is juxtaposed with an axially shiftable driven clutch member upon which the axially movable member of a screw-and-nut self-tightening means can operate, of a bimetallic element which, in effect, acts upon the movable clutch member to effect incipient rotation thereof and rotatable entrainment of the respective element of the self-tighening means to render the latter effective to apply axial force to the movable clutch member.

In this manner, the fan can be actuated by an instantaneously operating bistable thermostatic element. Moreover, the entire blower assembly can be made insensitive to the usual relative oscillation of the fan assembly with respect to the engine by mounting the thermostatic element, the self-tightening screw-and-nut arrangement and the fan blade upon a driven shaft journaled for rotation in the driving clutch member or its shaft. The entrainment of this shaft (in the open condition of the clutch) is only that of the bearings disposed between the driving shaft or clutch member and the fan shaft so that vibrations are avoided. When the clutch is closed, the driving shaft and the fan are practically positively coupled.

I have found, moreover, that it is advantageous to provide force-storing means for retaining the nut of the torque-responsive self-closure means against an abutment surface rotatable with the screw thereof, namely, the threaded fan-blade shaft, in the open condition of the clutch until the incipient clutching action overcomes the resisting force of the force-storing means. In this manner, accidental closure of the clutch is avoided and, once the retaining force is over, a rapid closure with minimum frictional wear results.

The above and other objects, features and advantages of the present invention will become more readily apparent from the following description, reference being made to the accompanying drawing in which:

FIG. 3 is a fragmentary cross-sectional view showing a modification of this invention.

Figure 1:
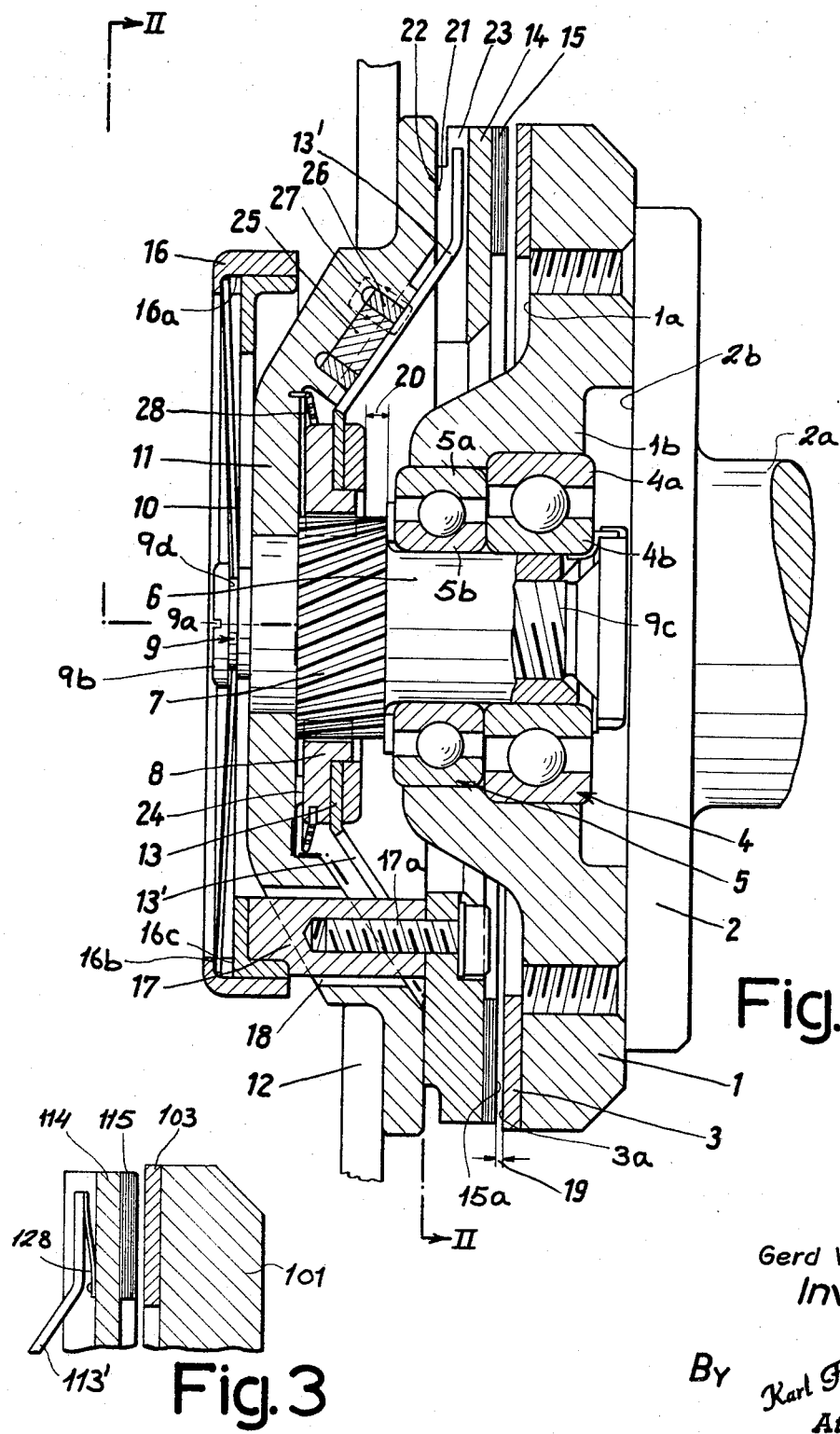
FIG. 1 is an axial cross-sectional view through a fan for an internal-combustion engine of an automotive vehicle in accordance with the present invention.

In the drawing, I show a thermostatically controlled fan system wherein the water-pump shaft 2a of the vehicle is driven by the crankshaft of the engine directly or indirectly (e.g., via a fan belt or the like) and is provided with a flange 2 at its forward end; the drive member 1 of a clutch according to this invention is bolted at the flange 2 so as to overlie the front surface 2b thereof. The exposed face 1a of the drive member of disk 1 of the clutch is formed with an annular friction lining 3 of the type commonly used in friction brakes and clutches around the hub 1b of this member. Within this hub 1b, I provide a pair of ball bearings generally designated 4 and 5 whose outer races 4a and 5a are entrained with the hub 1b of the driving clutch member 1. The bearings 4 and 5 serve to rotatably support a fan or blower shaft 6 with which the inner races 4b and 5b are entrained. The shaft 6 is formed with a threaded boss 7 axially remote from the flange 2, the boss 7 having coarse-pitch or "steep" threads of the type described in my aforementioned U.S. Patents 3,209,993 and 3,273,681 which form with the mating nut 8 a self-tightening clutch assembly for bringing the complementary or cooperating clutch members into rapid interengagement. The term "steep thread" is used herein to designate a thread of large pitch angle of the type capable of rapidly driving the clutch members axially into interengagement. Members 7 and 8 form a self-tightening screw-thread assembly of steep pitch within the contemplation of the present invention.

The nut 8 is axially movable along the threaded boss 7 and, of course, has a complementary coarse pitch thread. At the forward end of the fan shaft 6, there is provided a threaded stud 9 which may have a screw slot 9a in its head 9b to facilitate axial adjustment of this head relative to the shaft 6. The stud 9 can, accordingly, be formed with a threaded shank 9c which is screwed into the shaft 6 as can be seen in the portions thereof which are broken away in FIG. 1. The head 9b forms one flank of an annular groove 9d at the forward end of the stud 9 which receives a bimetallic disk 10 at its center aperture. The bimetallic disk 10 is a so-called "Spencer disk" and, upon increase in pressure, switches over from the position illustrated in FIG. 1, corresponding to inactivation of the fan blade to a position in which its outer periphery bears to the right as will be apparent hereinafter. Such disks are described in the aforementioned patents and can be considered to be bistable thermostatic devices having distinct axial modes corresponding respectively to clutch activation and clutch inactivation, the switchover between these modes being attained upon sensing by the disk of a temperature rise. To adjust the threshold of the device, the inner periphery of the disk 10 may be shifted relatively to its outer periphery in axial direction by rotating the axially shiftable stud 9 as previously described.

The shaft 6 carries a flange 11 upon which the fan 12 (illustrated diagrammatically in FIGS. 1 and 2) is mounted by conventional means. Disk 13 is mounted upon the nut 8 and is provided with a multiplicity of radially extending elastic arms 13'. These arms lie in a frusto-conical array and are received in respective radial grooves 23 of a ring 14 constituting the driven clutch member and provided with a friction layer 15 substantially coextensive with and confronting the friction layer 3 of the driving member 1. Members 1 and 14 thus form a clutch which, upon frictional engagement of the layers 3 and 15 under axial pressure, causes rotation of the flange 11 and the fan 12 at the speed of the shaft 2a. When the clutch members 1 and 14 are disengaged from one another, the flange 11 and the fan 12 are able to freewheel with the shaft 6, relative to the shaft 2a.

The bimetallic thermostatic disk 10 is surrounded by a housing 16 in which the outer periphery of the disk 10 is received with play between shoulders 16b and 16c defining an inner annular groove 16a. The housing 16 is, moreover, provided with three axially extending formations 17 (only one of which can be seen in FIG. 1) which respectively pass through openings 18 in flange 11 so that they can be connected via screws 17a to the ring 14. In this manner, the housing 16 is joined to the ring 14 and is acted upon, in the axial direction, by the thermostatic disk 10. The openings 18 thus can have the configuration of arcuate slots. The clutch faces 3a and 15a of the linings 3 and 15 define between them an air gap or play 19 which is somewhat smaller than the actuating stroke 20 of the coarse-pitch nut 8. The arcuate length of the slots 18 will, of course, correspond to the angular movement required for the axial stroke 20 of the nut 8.

Figure 2:
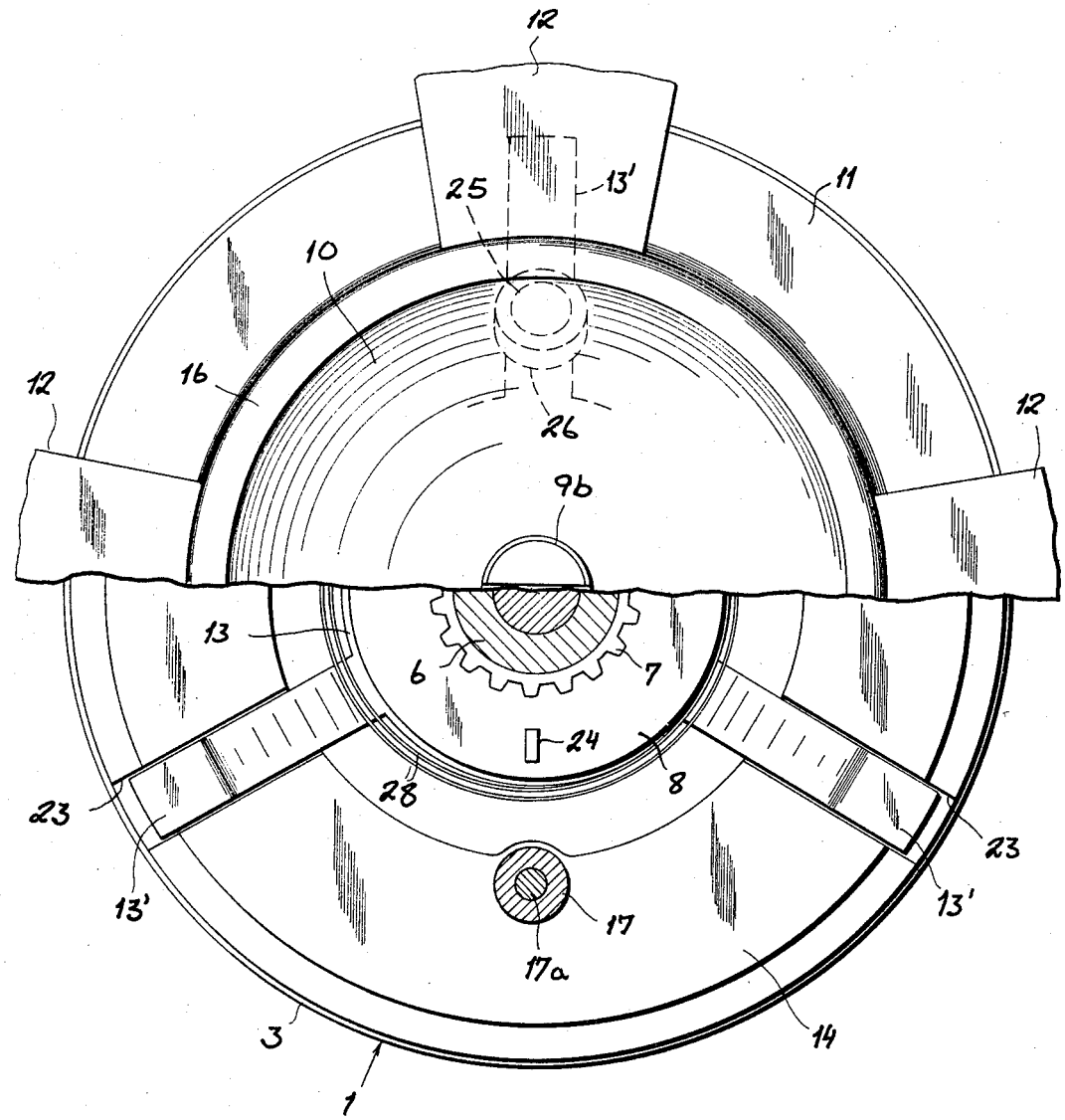
FIG. 2 is a view taken along the line II—II of FIG. 1.

In the position of the device illustrated in FIG. 1, which corresponds to the open or decoupled state of the clutch, the ring 14 is held by the three formations 18 of housing 16 and the axial bias of the disk 10 (to the left) with its abutment surface 21 against the surface 22 of the flange 11. The elastic arms 13' of the coarse-pitch nut 8 are received with axial play in the radial grooves 23 of ring 14 so that the nut 8 bears against the abutments 24 of the flange 11.

To retain the nut 8 against the abutment shoulder 24, permanent magnets 25 are distributed about the flange 11 in the region of the ferromagnetic arms 13', preferably with a sleeve 26 of nonmagnetic material surrounding each of the magnetic disks 25, which have axial poles. The flange 11 may then also be of a magnetically permeable material so that the magnetic-force lines or flux lines 27 form a closed path between the magnetic poles, through the surrounding portions of the flange 11 and through the respective arms 13'. The coarse-pitch nut 8 is, accordingly, immobilized by the magnetic means or urged against the abutment or shoulder 24 with the collective force developed by these arms. Alternatively or in addition, a spiral spring 28 may connect the flange and the nut 8 to urge the latter axially against the abutment 24. The latter may be angularly spaced ribs or bosses surrounding the shaft 6.

Upon an increase in the temperature of the air stream passing through the vehicle radiator and sensed by the disk 10 above a predetermined level, the disk 10 springs into its alternative mode and becomes concave to the right (FIG. 1). The housing 16 is thus shifted in the clutch-closing direction (i.e. to the right in FIG. 1) to urge the friction layer 15 of the ring 14 against the driven layer 3. The axial pressure is delivered to the ring 14 via the formations 17. When frictional contact is established to the extent that the ring 14 is entrained in the rotational sense of the driven clutch member 3, a torque is applied to the nut 8 via the rotatably entrained arms 13' and the self-tightening nut 8 rides along the threaded boss 7 through the stroke 20 to apply additional axial force (via arms 13') to hold the driven clutch member 14 against the driving member 1. The coupling members 1 and 14 are held together under maximum pressure and the rotation of the nut relative to the screw thread 7 is accomplished rapidly as soon as the magnetic retaining force is overcome in part by a transverse movement of the arms 13 with respect to the pole faces of the magnets and thereafter axial movement of these arms. The increasing distance between the arms and the permanent magnets 25 eliminates to any significant extent a resisting force since the attractive force falls off as the square of the distance between the arms 13' and the permanent magnets. The restoring force of spring 28 is likewise readily exceeded so that the nut 8 moves into its operative position to entrain the shaft 6 and the fan 12 carried thereby with the ring 14 and the driving clutch member 1. The fan is driven until the temperature of the air stream passing through the radiator of the vehicle again drops whereupon the bimetallic dished-disk bistable spring 10 returns to its position illustrated in FIG. 1.

Since the closing force of the clutch, as a consequence of the self-tightening action of the coarse-pitched screw-and-nut arrangement, is substantially higher than the axial forces developed by the disk 10, the clutch is first opened only when there is, for any reason, a momentary but small interruption of the torque which permits return of the nut 8 and release of the clutch to terminate rotation of the fan 12. The interruption of the torque applied to the nut 8 in the clutch-closing direction or the development of a momentary torque in the opposite direction to urge the nut in its opposite sense can be that development during the normal vibrations or oscillations of the engine which, in most automatic vehicles, is elastically suspended on the chassis. During the return movement, the disk 10 urges the nut 8 in its opening direction and, when the clutch is fully open, the arms 13' again are seized by the permanent magnets and releasably held against the flange 11. Because of the inertia of the nut 8 it continuously tends to be driven into its rest position, thereby supporting a rapid opening of the clutch.

The spring 28 and the permanent magnets 25 form a force-storing mechanism which retains the nut 8 against the abutments 24 of the flange 11 and which is overcome only when the thermal element 10 is tripped. The force-storing means operates counter to the activation force of the thermostatic elements and can be overcome by the self-tightening torque delivered to the nut. Other force-storing means can, of course be provided and in FIG. 3, for example, I show one alternative. Here, the ring 114 constituting the driven clutch member 101 carries a plurality of leaf springs 128 which bear upon the arms 113'. Other leaf-spring arrangements may, of course, be used provided they function in the manner illustrated in FIG. 3 and urge the nuts 8, etc., axially against the abutments 24 to position the self-tightening nuts with respect to the flange 11.

The invention described and illustrated is believed to admit of many modifications within the ability of persons skilled in the art, all such modifications being considered with the spirit and scope of the appended claims.

I claim:
1. A clutch system for a fan or the like, comprising: a pair of mutually engageable clutch members, one of said clutch members being connectable with a driving shaft and the other of said clutch members being connectable with a fan, one of said clutch members being axially shiftable into engagement with the other clutch member;

self-tightening means including a screw element and a nut element mutually engaging one another with a steep thread, an axially shiftable one of said elements being axially movable along the other of said elements, said nut element being rotatable to effect axial movement of the axially shiftable one element, said axially shiftable clutch member being formed as a ring surrounding the axis of said self-tightening means;

means connecting said axially shiftable clutch member with said rotatable element for operating said self-tightening means upon incipient engagement of said clutch members to increase the axial engagement pressure of said clutch members; and a thermostatic bistable bimetallic spring element acting upon the axially shiftable clutch member for bringing it into incipient engagement with the other clutch member, the screw element of said self-tightening means forming a driven shaft for rotating a fan blade.

2. A clutch system as defined in claim 1 wherein said driven shaft is journaled for rotation about said axis with respect to said one of said clutch members.

3. A clutch system as defined in claim 1 wherein said driven shaft is formed with a flange carrying said fan blade, further comprising force-storing means acting upon said nut element for urging same against said flange in a disengaged condition of said clutch members.

4. A clutch system as defined in claim 3 wherein said force-storing means includes permanent-magnet means for attracting said nut element against said flange.

5. A clutch system as defined in claim 4 wherein said nut element is provided with a multiplicity of radially extending angularly spaced magnetically permeable arms and said permanent-magnet means includes an array of angularly spaced permanent magnets on said flange respectively attracting said arms in a position of said nut element against said flange.

6. A clutch system as defined in claim 3 wherein said force-storing means includes a spiral spring engaging said nut element for yieldably retaining same against said flange.

7. A clutch system as defined in claim 1 wherein said means connecting said axially shiftable clutch members with said rotatable element includes a multiplicity of angularly spaced radially extending elastic arms carried by said nut element and engaging said ring, said ring being formed with a plurality of radial grooves respectively receiving said arms, said spring element being constituted as a dished spring disk and said thermostatic device including an axially shiftable housing engageable with the periphery of said disk and connected with said ring for displacement thereof by said disk into incipient engagement with said one of said clutch members, said disk engaging said driven shaft at a central portion of the disk.

8. A clutch system as defined in claim 1, further comprising adjusting means for axially shifting the central portion of said disk relative to said driven shaft.

9. A clutch system as defined in claim 1 wherein said one of said clutch members is an angular driving member mounted upon said driving shaft, said other clutch member confronting said driving member and being formed as an axially shiftable ring engageable with said driving member for frictional rotary entrainment therewith, said screw element being formed on a driven shaft journaled for rotation about the axis of said driving shaft relatively thereto, said driving shaft having an annular flange and a fan blade mounted upon said flange, said flange being formed with abutment means for said nut element, said nut element being axially shiftable along said driven shaft and rotatable relatively thereto, said means connecting said axially shiftable clutch member with said rotatable element of said self-tightening means including a multiplicity of angularly spaced radial elastic arms carried by said nut element, said ring being provided with angularly spaced radial grooves receiving said arms for entrainment of said nut element with said ring about said axis and application of axial forces by said nut element to said ring, said device including a bimetallic dished-spring disk mounted upon said driven shaft at a central portion of said disk, a housing surrounding said driven shaft and receiving the outer periphery of said disk for axial displacement of said housing thereby, and means passing through said flange for connecting said housing with said ring while permitting at least limited relative angular movement of said flange and said ring, said system further comprising force-storing means urging said nut element against said abutment means for axially and angularly retaining said nut element against said flange until said nut element is rotated by incipient engagement of said ring with said driving clutch member.

References Cited

UNITED STATES PATENTS

| | | | |
|---|---|---|---|
| 2,381,567 | 8/1945 | Bonham | 230—271 |
| 2,881,890 | 4/1959 | Welch | 192—82 |
| 2,950,796 | 8/1960 | Becker | 192—82 |
| 2,986,250 | 5/1961 | Becker | 192—82 |
| 3,158,241 | 11/1964 | Bloom | 192—82 |

ROBERT M. WALKER, *Primary Examiner.*